United States Patent [19]

Pyhalammi

[11] Patent Number: 5,526,154
[45] Date of Patent: Jun. 11, 1996

[54] METHOD OF ESTABLISHING A SUBSCRIBER CONNECTION AND A SUBSCRIBER NETWORK

[75] Inventor: Seppo Pyhalammi, Helsinki, Finland

[73] Assignee: Nokia Telecommunications Oy, Espoo, Finland

[21] Appl. No.: 356,220

[22] PCT Filed: Jun. 11, 1993

[86] PCT No.: PCT/FI93/00256

§ 371 Date: Feb. 8, 1995

§ 102(e) Date: Feb. 8, 1995

[87] PCT Pub. No.: WO93/26101

PCT Pub. Date: Dec. 23, 1993

[30]     Foreign Application Priority Data

Jun. 17, 1992 [FI] Finland ................................. 922837

[51] Int. Cl.⁶ ............................. H04J 14/02; H04B 10/00
[52] U.S. Cl. ........................... 359/125; 359/113; 359/157; 359/173; 359/161
[58] Field of Search ................................. 359/113, 118, 359/125, 137, 157, 173, 179, 161

[56]     References Cited

U.S. PATENT DOCUMENTS 4,441,180  4/1984  Schussler ............................. 370/3

5,153,763  10/1992  Pidgeon ............................. 359/125

FOREIGN PATENT DOCUMENTS

| 0318335 | 5/1989 | European Pat. Off. .......... H04B 9/00 |
| 389062 | 9/1990 | European Pat. Off. . |
| 433023 | 6/1991 | European Pat. Off. . |
| 436820 | 7/1991 | European Pat. Off. . |

*Primary Examiner*—Leo Boudreau
*Assistant Examiner*—Kinfe-Michael Negash
*Attorney, Agent, or Firm*—Cushman Darby & Cushman

[57]     ABSTRACT

For establishing a subscriber connection in a data transmission network and to a subscriber network, a subscriber connection is established by forming a first portion of a transmission connection on the subscriber side in an electrical form and a second portion of the connection on the exchange side in an optical form by means of an optical fibre. There are optoelectric converters at both ends of the second portion of the connection. In order to get rid of transmission devices of an active subscriber network, which devices are to be positioned in the field and are difficult to maintain, a signal transmitted by a transmission device of a subscriber is connected, without correcting the attenuation and distortion caused by the first portion, via one of the optoelectric converters, to said said portion correspondingly, a signal is transmitted from the exchange towards the subscriber, which signal is intended for the first portion and is at first connected via the other one of the optoelectric converters to the said portion.

4 Claims, 2 Drawing Sheets

METHOD OF ESTABLISHING A SUBSCRIBER CONNECTION AND A SUBSCRIBER NETWORK

BACKGROUND OF THE INVENTION

The invention relates to a method of establishing a subscriber connection and to a subscriber network. In the method a subscriber connection is established by forming a first portion of a transmission connection on the subscriber side in an electrical form and a second portion of the connection on the exchange side in an optical form by means of an optical fibre, whereby there are optoelectric converters at both ends of said second portion of the connection. A subscriber network according to the invention is useful for practicing the method.

Optical fibre is a self-evident choice for a transmission medium of a trunk network, because trunk connections generally require a large transmission capacity, transmission distances used are long and cable routes ready for use are often available. On the other hand, the situation in a subscriber connection is often quite the opposite and sufficient reasons for using optical fibre rarely exist.

Naturally, with a continuously increasing need for speed, the situation is changing in a more advantageous direction for the optical fibre, but no significant savings can be expected in the total costs, mainly resulting from cable installation costs. A wish is, however, to fit out the subscriber network as well with as much optical fibre as possible, because it is obvious that it will be required in the future. Costs of reconstructing a subscriber network are very high and, as to the time, it is a matter of decades in this connection. Consequently, it would be worth while being prepared for coming needs and providing facilities for the future at present already.

Accordingly, teleoperators try to increase the number of fibres in a subscriber network, as far as it is economically possible. In practice there are two possibilities of increasing the number of fibres. Firstly, optical fibre can be installed at relatively low additional costs in connection with cable supplements. However, the fibre often remains awaiting future users. The other way is to find customers who need high speed and thus optical fibre and who are ready to pay for it.

The fact is that high costs are the worst obstacle to introducing the fibre into the subscriber network.

In a so-called active subscriber network, there are transmission devices also "in the field" (in the area between a terminal exchange and a subscriber). The object of an active subscriber network is to divide the costs of constructing a transmission connection among several subscribers and to utilize existing copper cabling as far as possible. FIG. 1 shows the principle of an active subscriber network. A transmission equipment, joining an optical portion and a copper portion of a subscriber connection and having a box indicated by reference mark B, is positioned in the field in such a place where subscribers 12 are reached by means of an existing copper cabling 13. The transmission equipment typically comprises a multiplexer 11 and baseband modems 14 for each subscriber connection. Correspondingly, each subscriber has a modem 14 of its own, which modems can operate at different rates. A connection from the multiplexer 11 to an exchange 16 is formed by means of an optical fibre 15. The maximum length of the copper portion 13 is typically 0.5 . . . 1 km and the length of the optical portion 15 typically 1 . . . 5 km.

By means of the arrangement described above, the costs of establishing an optical fibre cable connection can be divided among several subscribers 12. The costs are further lowered by possible finished pipings, occurring most probably just in the vicinity of exchanges. Consequently, the most expensive part of the connections, i.e. individual connections to subscribers, would consist of existing copper cable connections, which means that they would be practically almost free of cost.

On the basis of crosstalk between the pairs of a pair cable and an attenuation of a copper cable, it can be estimated that, by using one quad, it is possible in practice to achieve a distance of one kilometer at the rate of 8 Mbit/s and a distance of 2,5 km at the rate of 2 Mbit/s. By using 2 or 3 quads and by accepting a distance of about 500 meters, the rate can be even 34 Mbit/s.

By means of the active subscriber network described above, connections faster than 2 Mbit/s are thus achieved at reasonable costs. If an optical cable is terminated at a distance of about one kilometer from the subscribers at the maximum, a conventional G.703/2 Mbit/s interface and a transmission according to that can be used as such (no separate modem is necessary).

However, an active subscriber network has drawbacks, too, which will be described in the following. Firstly, the large size of the devices leads to the fact that it may be difficult to find a place in the field where the devices required can be positioned. Additionally, the structure of the devices ought to be modular so that interfaces of different kinds can be provided. Simultaneously, the structure ought to withstand hard environmental conditions. Moreover, the devices consume so much power that it is not possible in practice to feed such a quantity of power all the way from the exchange.

Control over the devices constitutes a further problem. There is one more place in a transmission connection of an active subscriber network into which a modem required shall be introduced. It is necessary to know how to configurate this modem right or how to arrange a possibility of remote configuration. This concerns multiplexers, too. Additionally, it shall be possible to control the operation of the devices, and e.g. changes in configuration for one subscriber must not cause any harm to the other subscribers. It is also very laborious to maintain and replace transmission devices in the field.

SUMMARY OF THE INVENTION

The object of the present invention is thus to avoid the above drawbacks and to provide a method by which fast subscriber connections ($\geq 2$ Mbit/s) can be established in an economically profitable way. This object is achieved by means of the method of the invention, which is characterized in that a signal transmitted by a transmission device of a subscriber is connected, without correcting the attenuation and distortion caused by said first portion, via an optoelectric converter to said second portion and that, correspondingly, a signal is transmitted from the exchange towards the subscriber, which signal is intended for said first portion and is at first connected via the optoelectric converter to said second portion. The subscriber network of the invention is, in turn, useful for practicing the method.

The basic idea of the invention is to "stretch" a copper cable starting from a subscriber towards the exchange by means of an optical link in such a way that, seen from the end, the whole transmission connection comprising both the electrical portion (copper portion) and the optical portion looks like a copper cable, the length of which is identical with the length of the copper portion, as far as distortion and attenuation are concerned. The subscriber connection can thus be made physically considerably longer than it would be otherwise, i.e. due to distortion, attenuation and crosstalk.

Due to the solution provided by the invention, the modems required can always be positioned in exchange premises and the structure of the device to be positioned in the field is simple and always similar. The power required by the device to be positioned in the field is reasonable and permits remote power supply from the exchange. The device does not need to know either what is transmitted by the connections, but it transmits a signal occurring in a cable as such, and therefore, no configuration is needed. Additionally, the solution of the invention makes the maintenance and replacement of the equipment simpler.

BRIEF DESCRIPTION OF THE DRAWINGS

In the following the invention will be described more accurately referring to the examples according to FIGS. 2 to 4 of the attached drawings, in which.

DETAILED DESCRIPTION

Figure 1:
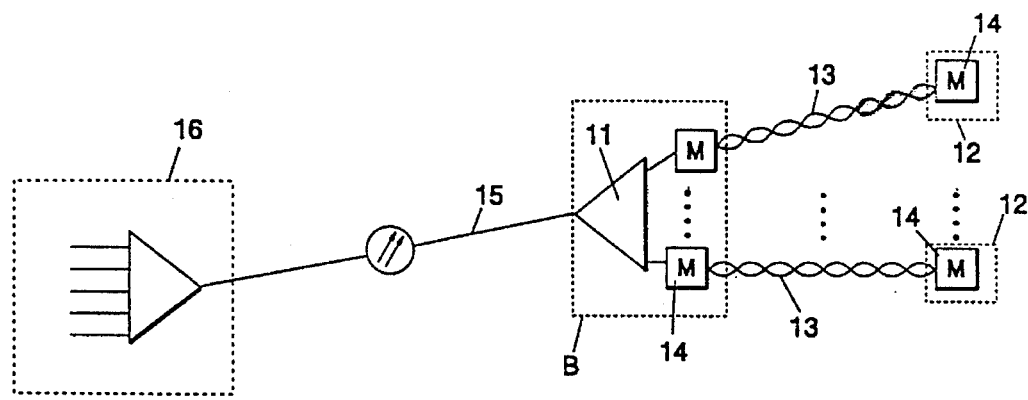
FIG. 1 shows the principle of an active subscriber network.
Figure 2:
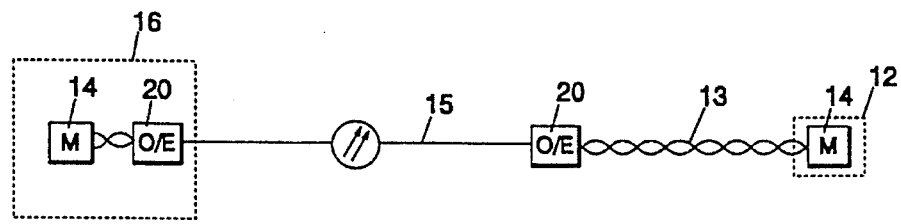
FIG. 2 shows an establishment of a subscriber connection by using the principle of the invention.

FIG. 2 shows the principle of one channel of a subscriber connection established by the method of the invention. An optoelectric converter 20 is positioned at the exchange 16 end of a copper cabling 13 starting from a subscriber 12, e.g. a corporation, preferably in a place corresponding to the transmission equipment of FIG. 1, in which subscribers are reached by means of the existing copper cabling 13. This converter converts an analog electric signal coming from the subscriber into an optical form for an optical portion 15. At the opposite end of the optical portion (in the input of the exchange 16), there is another optoelectric converter 20, which converts the optical signal back to the analog electric form, in which form it is connected to the exchange in a manner known per se. (The term optoelectric converter is used in this connection irrespective of which conversion direction (transmission direction) is in question in each case.) The optical portion 15 and the converters 20 at the ends thereof thus form an optical link, by which the copper cabling 13 of each subscriber connection is stretched longer, as far as to the exchange 16 in practice. A signal transmitted by a transmission device 14 of the subscriber is then connected as such, i.e. distorted and attenuated by the copper cabling portion, to the optical portion 15, and these distortions and attenuations of the subscriber connection are not corrected until at the exchange interface. In a respective way, a signal is transmitted from the exchange in another transmission direction, which signal is intended for the copper cabling portion. This signal is at first connected to the optical portion by means of an optoelectric electric converter and then converted back to the electrical form and connected directly to the copper cabling portion 13. In this transmission direction, attenuations and distortions do not occur until at the final end of the transmission connection, i.e. at the copper cabling portion. The whole transmission connection can thus be made physically considerably longer than it would be otherwise, i.e. due to distortion and attenuation, because practically only the copper portion causes distortion and attenuation in a transmission connection established in this way.

In practice, as a line code can serve in both transmission directions e.g. a 2B1Q code known per se, but any other line code by which the spectrum of a signal can be made suitable for a transmission path is equally possible. (The line code represents how bits are changed into an analog form for a transmission connection.)

Figure 3:
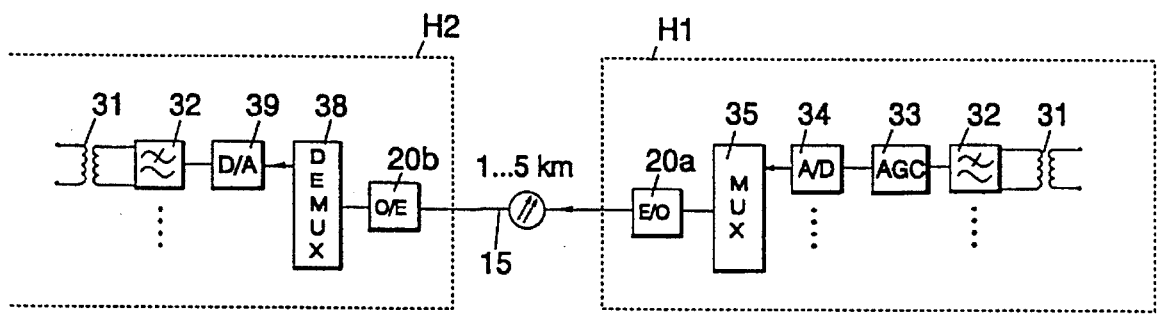
FIG. 3 shows a solution of a preferred embodiment of the invention, in which one optical link transmits data of more than one channel.

FIG. 3 shows a preferred practical embodiment of the invention. In this case an analog signal to be obtained from the copper cabling portion 13 is digitized by analog/digital converters 34 for the time of a transmission performed by the optical portion 15, and one optical link transmits data of more than one channel (subscriber). The copper cabling 13 of more than one subscriber (not shown in FIG. 3) is thus connected via a corresponding isolation transformer 31, a low-pass filter 32, a gain control circuit 33 (by which the signal is scaled to a suitable level) and an A/D converter 34 mentioned above to a common multiplexer 35, the output of which is connected to the optical portion (fibre) 15 via an optoelectric converter 20a. The converter 20a comprises in this case an optical transmitter, e.g. a laser or a LED. The signal coming from the optical portion (fibre) 15 is received by another optoelectric converter 20b, which comprises a receiver, e.g. a PIN diode, for the optical signal. The output of the converter 20b is connected to a demultiplexer 38, which delivers the channels to separate D/A converters 39, by which the signals are converted back to the analog form and connected in a manner known per se via respective low-pass filters 32 and isolation transformers 31 to the exchange equipment.

FIG. 3 shows the implementation only in one transmission direction (from a subscriber to an exchange). The other transmission direction has been implemented in a corresponding manner. It shall be noted that in spite of the fact that the signals are digitized in this example for the time of a transmission performed by the optical link, the signals at the ends of the optical link are still analog. The optical portion 15 is thus connected by means of an electric coupling in an analog form directly to the copper cabling portion, on the one hand, and to the exchange interface, on the other hand. A multiplexer unit to be positioned in the field is indicated by reference mark H1 in FIG. 3.

Instead of digitizing a signal temporarily for the time of a transmission in the manner described above, a purely analog solution can be used, in which the separate channels are modulated to different frequencies to the same fibre.

Figure 4:
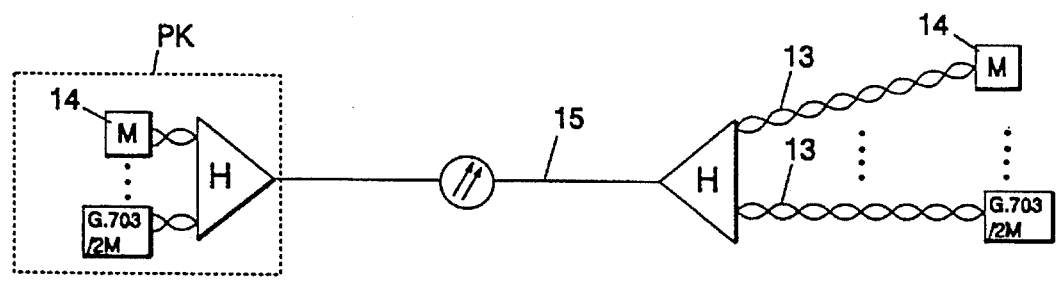
FIG. 4 shows a typical application of the solution of the invention.

FIG. 4 shows a typical application of the solution of the invention. A multiplexer/demultiplexer unit H, comprising the optoelectric converters described above and being (in both transmission directions) identical with the unit shown in FIG. 3, for instance, is positioned at a terminal exchange PK, and another similar unit H is positioned in the manner described above in the field in a place where the subscribers 12 can be reached by means of the existing copper cabling 13. The power supply of the multiplexer unit H in the field occurs from the terminal exchange PK. The modems 14 are situated in their known places, i.e. in the exchange and with the subscribers (cf. FIG. 1). If the copper cabling portion is short enough, the G.703 interface will do as such and no separate modems are needed at all.

Figure 5:
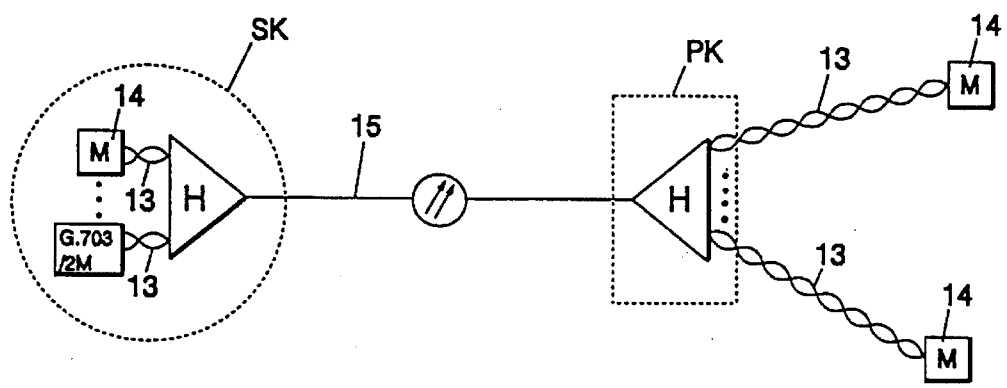
FIG. 5 shows a second application of the solution of the invention.

Another application of the solution of the invention is shown in FIG. 5. Because there are many terminal exchanges PK, it may not always be preferable e.g. for labour and network management to position all different data transmission devices in every place. Accordingly, data transmission devices and staff can be concentrated by positioning the multiplexer unit H at the subscriber end of the optical portion 15 in a terminal exchange PK and the multiplexer unit at the opposite end of the optical portion in a tandem exchange SK. Consequently, the optical portion 15 is in this case between the tandem exchange and the terminal exchange and the copper portion 13 between the terminal exchange and the subscriber.

Though the invention has been described above referring to the examples of the attached drawings, it is clear that the invention is not restricted to it, but it can be modified in many ways within the scope of the inventive idea presented above and in the attached claims. The transmission apparatuses of the subscriber, for instance, can be of different types.

I claim:

1. A method for establishing a two-way communications connection between a subscriber and an exchange in a data transmission network, comprising the steps of:
   (a) providing a first portion of the connection, on a subscriber side, in an electrical form, between the subscriber, and a second portion which is closer to the exchange than is said first portion;
   (b) providing said second portion, on an exchange side, in an optical form, along an optical fiber, said second portion having one end nearest said first portion, and an opposite end nearest said exchange, along said optical fiber;
   (c) providing respective optoelectric converters at said one and opposite ends of said second portion, for converting optical signals to electrical signals, and vice versa;
   (d) providing a remainder of the connection between the one of said optoelectric converters provided at said opposite end of said second portion, and said exchange;
   (e) connecting a signal transmitted by a transmission device of said subscriber, along a communications path extending from said subscriber via said first portion, said optoelectric converter at said one end, said second portion, said optoelectric converter at said opposite end, and said remainder, without substantially correcting attenuation and distortion caused by said first portion between said first portion and said opposite end of said second portion, this signal having an analog form between the subscriber and said optoelectric converter at said one end,
   (f) correcting said attenuation and distortion, at a location along said path between said optoelectric converter at said opposite end, and said exchange; and
   (g) transmitting a signal in analog form along said path from the exchange towards said subscriber, this signal having an analog form between the exchange and said said optoelectric converter at said opposite end.

2. A method for establishing a two-way communications connection between each of a plurality of subscribers and an exchange in a data transmission network, comprising the steps of:
   (a) providing a first portion of the connection, on a subscriber side, in an electrical form, between each subscriber, and a second portion which is closer to the exchange than is each said first portion;
   (b) providing said second portion, on an exchange side, in an optical form, along an optical fiber, said second portion having one end nearest each said first portion, and an opposite end nearest said exchange, along said optical fiber;
   (c) providing respective optoelectric converters at said one and opposite ends of said second portion, for converting optical signals to electrical signals, and vice versa;
   (d) providing a remainder of the connection between the one of said optoelectric converters provided at said opposite end of said second portion, and said exchange;
   (e) connecting a signal transmitted by a respective transmission device of each of a plurality of said subscribers, along a communications path extending from the respective said subscriber via the respective said first portions, said optoelectric converter at said one end, said second portion, said optoelectric converter at said opposite end, and said remainder, without substantially correcting attenuation and distortion caused by the respective said first portions between said first portion and said opposite end of said second portion, this signal having an analog form between the respective subscribers and said optoelectric converter at said one end,
   (f) correcting said attenuation and distortion, at a location along said path between said optoelectric converter at said opposite end, and said exchange; and
   (g) transmitting on a respective plurality of channels respective signals in analog form along said path from the exchange towards the respective said subscribers, these signals having an analog form between the exchange and said said optoelectric converter at said opposite end.

3. The method of claim 2, further including:
   temporarily digitizing said signals for transmission along said optical fiber, at respective locations between said first portions and said remainder.

4. A data transmission network for providing a two-way communications connection between an exchange and at least one subscriber, comprising:
   (a) for each said subscriber, a respective first portion of the connection, on a subscriber side, arranged for signalling electrically, between the subscriber, and a second portion which is closer to the exchange than is each said first portion;
   (b) a second portion, on an exchange side, arranged for signalling optically, along an optical fiber, said second portion having one end nearest each said first portion, and an opposite end nearest said exchange, along said optical fiber;
   (c) respective optoelectric converters provided at said one and opposite ends of said second portion, for converting optical signals to electrical signals, and vice versa;
   (d) a remainder of the connection, between the one of said optoelectric converters provided at said opposite end of said second portion, and said exchange;
   (e) for each subscriber, a transmission device for connecting a respective signal, along a respective communications path extending from the respective said subscriber via the respective said first portion, said optoelectric converter at said one end, said second portion, said optoelectric converter at said opposite end, and said remainder, without substantially correcting attenuation and distortion caused by said first portion between said first portion and said opposite end of said second portion, this signal having an analog form between the subscriber and said optoelectric converter at said one end, (f) means for correcting said attenuation and distortion, at a location along said path between said optoelectric converter at said opposite end, and said exchange; and (g) means for transmitting a respective signal in analog form along each said path from the exchange towards a respective said subscriber, each such signal having an analog form between the exchange and said said optoelectric converter at said opposite end.

* * * * *